United States Patent
Miyazono

(10) Patent No.: US 11,056,951 B2
(45) Date of Patent: Jul. 6, 2021

(54) MOTOR COOLING DEVICE

(71) Applicant: TOYOTA JIDOSHA KABUSHIKI KAISHA, Toyota (JP)

(72) Inventor: Hideaki Miyazono, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 168 days.

(21) Appl. No.: 16/519,587

(22) Filed: Jul. 23, 2019

(65) Prior Publication Data

US 2020/0127536 A1 Apr. 23, 2020

(30) Foreign Application Priority Data

Oct. 17, 2018 (JP) .............................. JP2018-195600

(51) Int. Cl.
*H02K 1/32* (2006.01)
*H02K 9/193* (2006.01)
*H02K 24/00* (2006.01)
*H02K 11/225* (2016.01)

(52) U.S. Cl.
CPC ............... *H02K 9/193* (2013.01); *H02K 1/32* (2013.01); *H02K 11/225* (2016.01); *H02K 24/00* (2013.01)

(58) Field of Classification Search
CPC ........... H02K 1/32; H02K 1/325; H02K 9/19; H02K 9/193; H02K 9/197; H02K 11/225; H02K 24/00
See application file for complete search history.

(56) References Cited

FOREIGN PATENT DOCUMENTS

| JP | 2012-151930 A | | 8/2012 |
|---|---|---|---|
| JP | 2015089748 A | * | 5/2015 |
| JP | 2016-032380 | * | 3/2016 |
| JP | 2018-027003 A | | 2/2018 |

OTHER PUBLICATIONS

Kumagai, Machine Translation of JP2015089748, May 2015 (Year: 2015).*
Kanehar, Machine Translation of JP2016032380, Mar. 2016 (Year: 2016).*

* cited by examiner

*Primary Examiner* — Quyen P Leung
*Assistant Examiner* — Eric Johnson
(74) *Attorney, Agent, or Firm* — Oliff PLC

(57) ABSTRACT

A motor cooling device includes an annular member that rotates with a shaft of a motor, and an oil catch unit that has a groove-shaped cross-section and is disposed along an outer circumference of the annular member, with a groove of the oil catch unit facing an outer circumferential surface of the annular member. The oil catch unit extends toward a backward side in a rotation direction of the annular member so as to form an arc shape, and includes a closure plate that covers the groove at an end in a circumferential direction located on a forward side in the rotation direction, and an oil spout hole that is bored near the closure plate. The annular member includes a protrusion that is provided on the outer circumferential surface of the annular member and that moves toward the closure plate when the annular member rotates with the shaft.

6 Claims, 4 Drawing Sheets

MOTOR COOLING DEVICE

CROSS-REFERENCE TO RELATED APPLICATIONS

This application claims priority to Japanese Patent Application No. 2018-195600 filed on Oct. 17, 2018, which is incorporated herein by reference in its entirety.

BACKGROUND

1. Technical Field

The present disclosure relates to a structure of a motor cooling device that cools a rotor of a motor.

2. Description of Related Art

Various methods for cooling a rotor by circulating cooling oil have been proposed. For example, Japanese Patent Application Publication No. 2018-27003 (JP 2018-27003 A) proposes a method in which a first cooling channel that communicates with a center hole of a shaft and extends in a radial direction and a second cooling channel that communicates with the first cooling channel and extends in an axial direction are disposed inside a rotor, and cooling oil flowing into the center hole of the shaft is caused to flow through the first cooling channel and the second cooling channel to thereby cool the rotor.

SUMMARY

There are cases where a solid shaft that does not include such a center hole as described in JP 2018-27003 A, or a shaft that has a drive shaft coaxial structure in which a drive shaft is coaxially disposed inside the shaft, is used as a motor shaft. In such cases, it is not always possible to supply cooling oil to the rotor and sufficiently cool the rotor by the method described in JP 2018-27003 A.

The present disclosure provides a motor cooling device that efficiently cools a rotor having a shaft without a center hole.

In an aspect of the present disclosure, a motor cooling device includes an annular member and an oil catch unit. The annular member is fixed to an outer circumference of a shaft of a motor and configured to rotate with the shaft inside a casing. The oil catch unit has a groove-shaped cross-section and is disposed inside the casing along an outer circumference of the annular member, with a groove of the oil catch unit facing an outer circumferential surface of the annular member. The oil catch unit extends from a lower side of the annular member in a direction of gravity toward a backward side in a rotation direction of the annular member so as to form an arc shape. The oil catch unit includes a closure plate and an oil spout hole, the closure plate being located on a forward side in the rotation direction and covering the groove at an end in a circumferential direction, and the oil spout hole being bored near the closure plate so as to open toward a rotor of the motor. The annular member includes a protrusion. The protrusion is provided on the outer circumferential surface of the annular member, and is configured to move inside the groove of the oil catch unit toward the closure plate, on a radially inner side of the closure plate, when the annular member rotates with the shaft.

According to this aspect of the present disclosure, cooling oil collected in the oil catch unit is pressurized by being pressed toward the closure plate by the protrusion of the annular member, and is then spouted from the oil spout hole toward the rotor of the motor to thereby cool the rotor. Thus, the rotor can be efficiently cooled even when the shaft includes no center hole.

In the above motor cooling device, the rotor of the motor may include a cooling channel extending in an axial direction of the rotor, and the oil catch unit may include a pipe that is mounted on a surface facing the rotor and that extends toward the cooling channel of the rotor.

Even when the shaft does not include a center hole, the motor cooling device as described above can cool the rotor by supplying cooling oil to the cooling channel of the rotor.

In the above motor cooling device, the oil catch unit may include an oil receiving plate extending radially outward from an end of the groove in the circumferential direction located on the backward side in the rotation direction.

The motor cooling device as described above can introduce a larger amount of cooling oil into the groove of the oil catch unit and supply a larger amount of cooling oil to the rotor for efficient cooling of the rotor.

In the above motor cooling device, the oil catch unit may be a part that has a groove-shaped cross-section and that is provided by an axial end surface of a resolver stator mounted inside the casing and an L-shaped section member mounted on the axial end surface, and the annular member may be disposed on a resolver rotor rotating inside the resolver stator, adjacent to the rotor of the motor.

In the motor cooling device as described above, a part of the resolver mounted inside the casing is used as a constituent member of the oil catch unit, which allows for downsizing of the motor. Moreover, the rotor can be efficiently cooled by a simple configuration.

In the above motor cooling device, the L-shaped section member, the annular member, and the pipe may be composed of resin. Alternatively, the L-shaped section member and the pipe may be composed of resin while the annular member may be composed of metal.

The motor cooling device as described above is less likely to degrade the rotation angle detection accuracy of the resolver, even when a part of the structure of the resolver is used to form the motor cooling device.

As has been described above, the motor cooling device of the present disclosure can efficiently cool a rotor having a shaft without a center hole.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
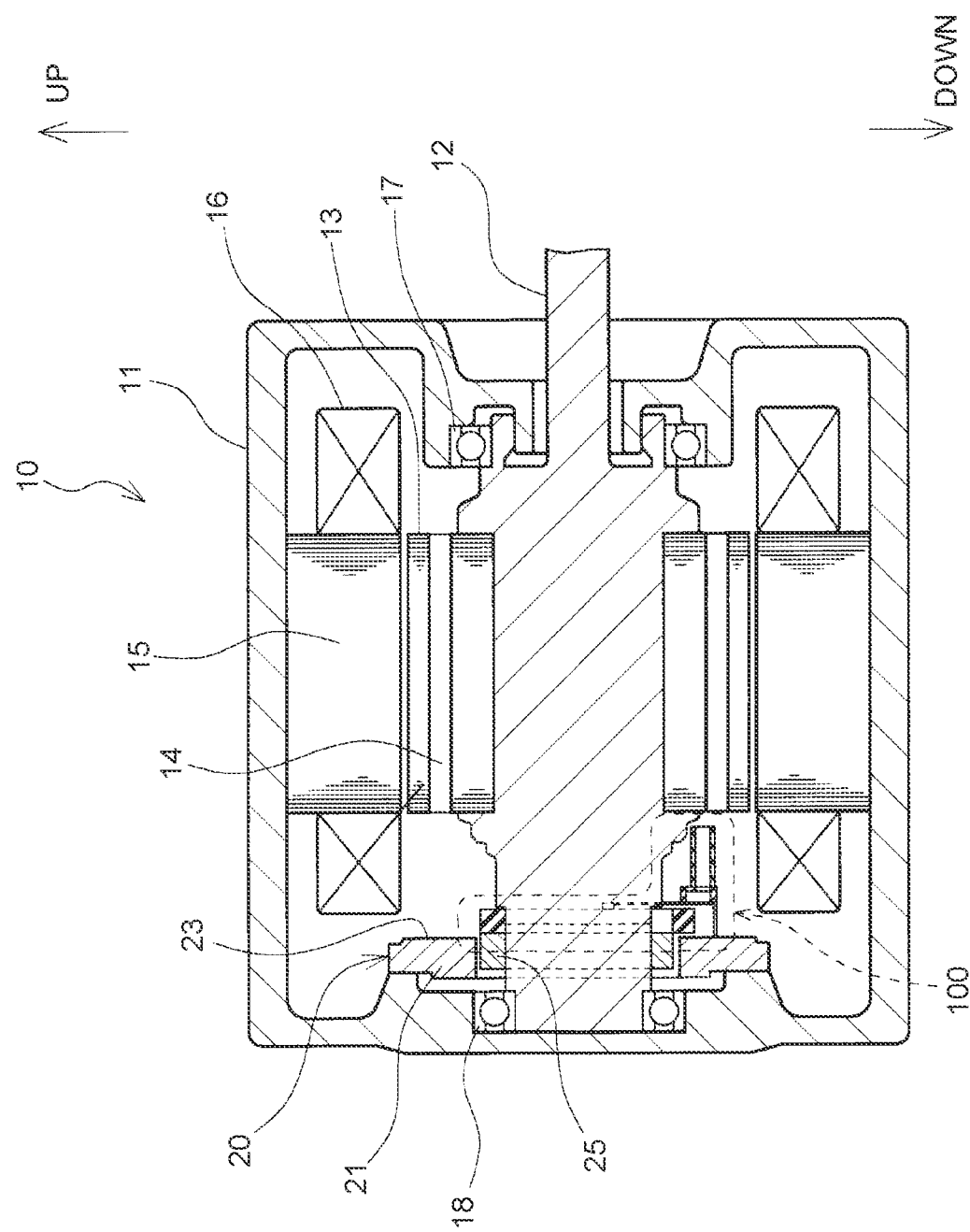
FIG. 1 is a sectional view of a motor in which a motor cooling device of an embodiment of the present disclosure is mounted.

The configuration of a motor cooling device of an embodiment will be described. A motor cooling device 100 will be described below with reference to the drawings. As shown in FIG. 1, a motor 10 in which the motor cooling device 100 of the embodiment is mounted is composed of a casing 11, a shaft 12 rotatably supported inside the casing 11 by two bearings 17, 18, a rotor 13 fixed to an outer circumference of the shaft 12, and a stator 15 disposed on an outer circumference of the rotor 13. The rotor 13 is formed by stacking magnetic steel sheets, and includes a plurality of cooling channels 14 which extends in an axial direction and through which cooling oil flows. The stator 15 includes a stator core formed by stacking magnetic steel sheets and a coil wound around the stator core, with a coil end 16 formed on each end surface in an axial direction.

A resolver 20 is mounted inside the casing 11, near the bearing 18. The resolver 20 is composed of a resolver stator 21 that is fixed inside the casing 11, and a resolver rotor 25 that is fixed to the outer circumference of the shaft 12 and rotates inside the resolver stator 21. The motor cooling device 100 is provided between the resolver 20 and the rotor 13.

Figure 2:
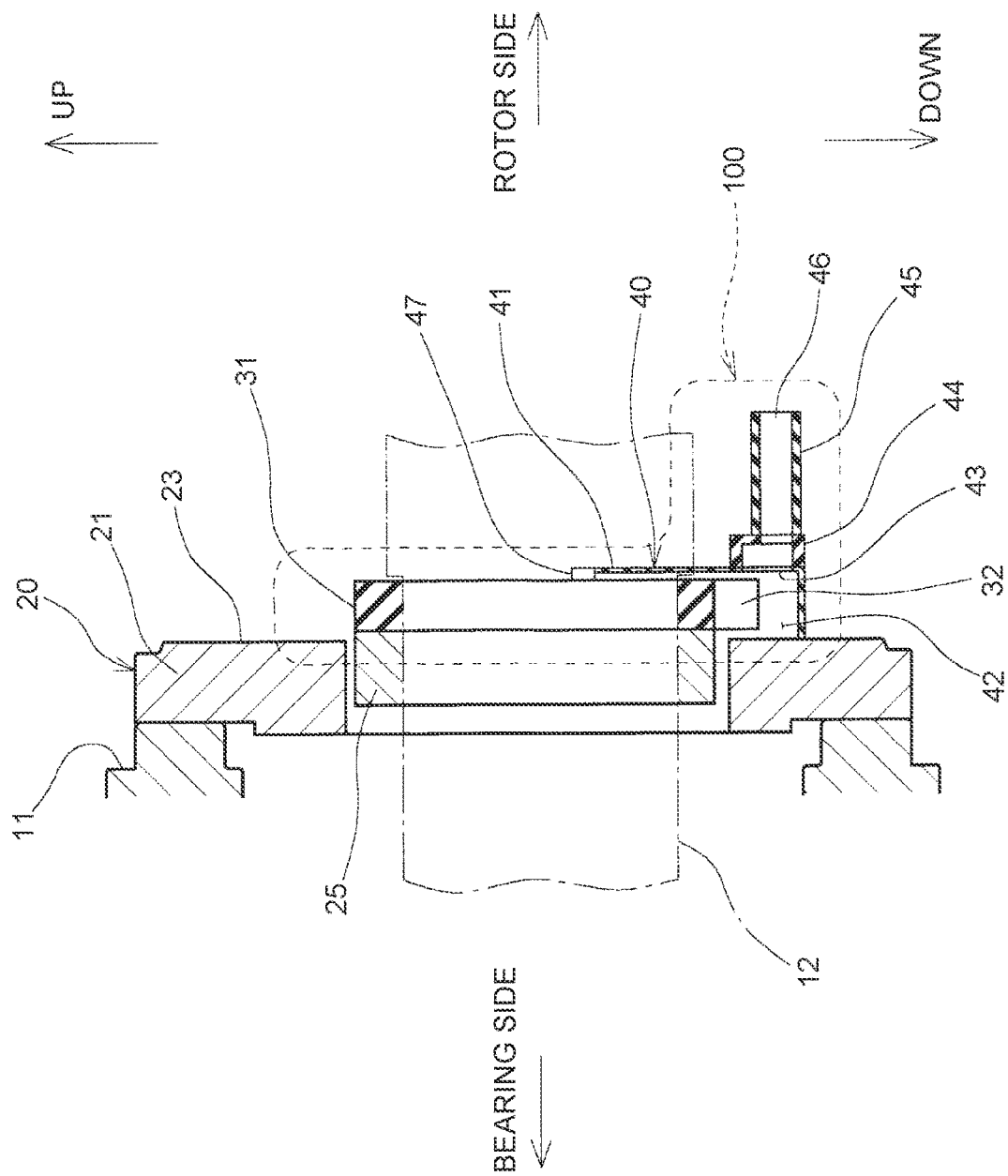
FIG. 2 is an enlarged sectional view of a resolver and the motor cooling device mounted in the motor shown in FIG. 1.
Figure 4:
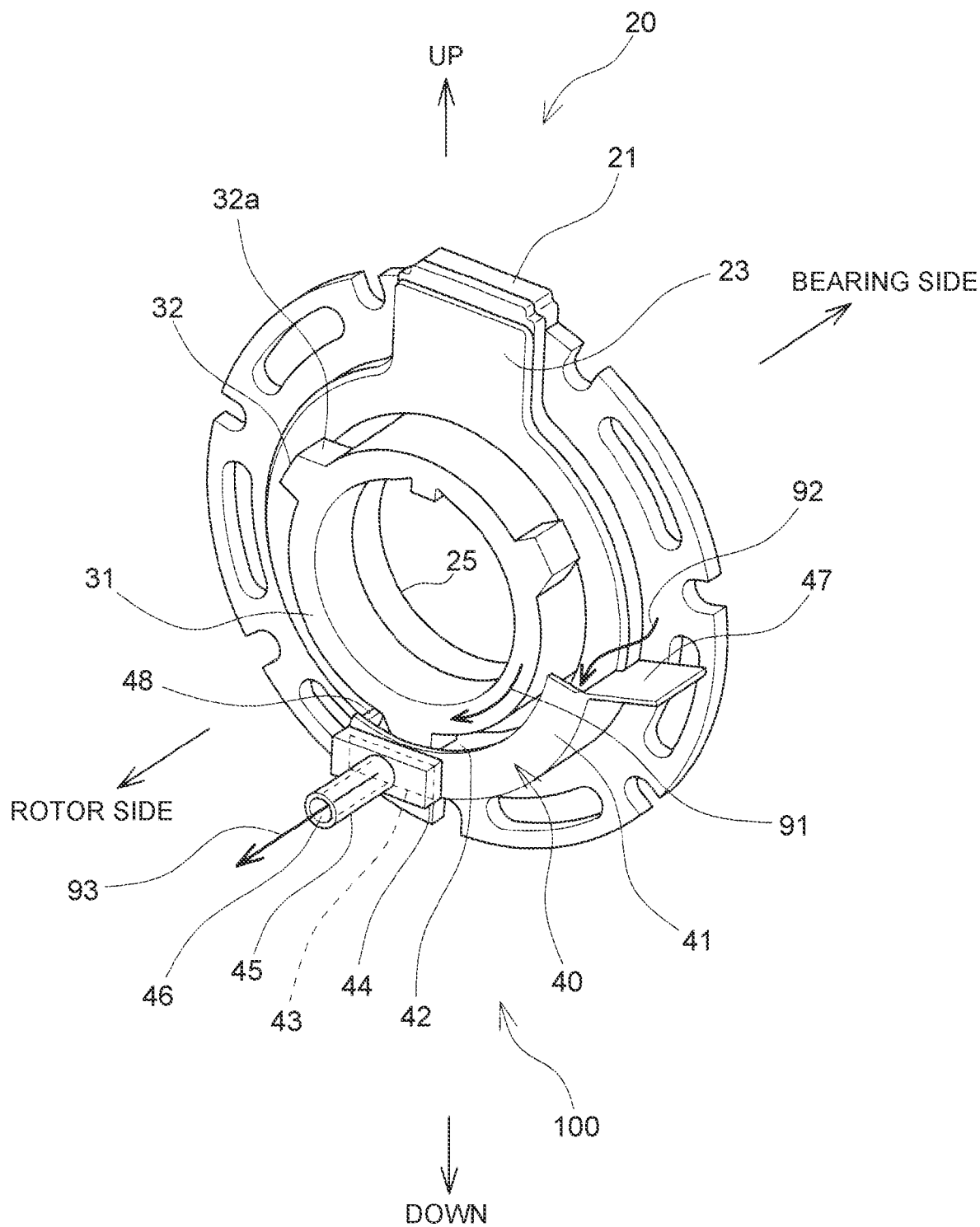
FIG. 4 is a perspective view of the motor cooling device formed on a side of the resolver facing the rotor.

As shown in FIG. 2 and FIG. 4, the motor cooling device 100 is composed of an annular member 31, an L-shaped section member 41, a closure plate 48, an oil receiving plate 47, a chamber 44, and a pipe 45. These constituent members are made of resin.

The annular member 31 is fixed to the outer circumference of the shaft 12 and rotates with the shaft 12 inside the casing 11. The L-shaped section member 41 is fixed to the resolver stator 21 at an axial end surface 23 facing the rotor 13. The L-shaped section member 41 and the axial end surface 23 form a groove-shaped cross-section including a groove 42. The groove 42 extends along an outer circumference of the annular member 31 while facing an outer circumferential surface of the annular member 31.

Figure 3:
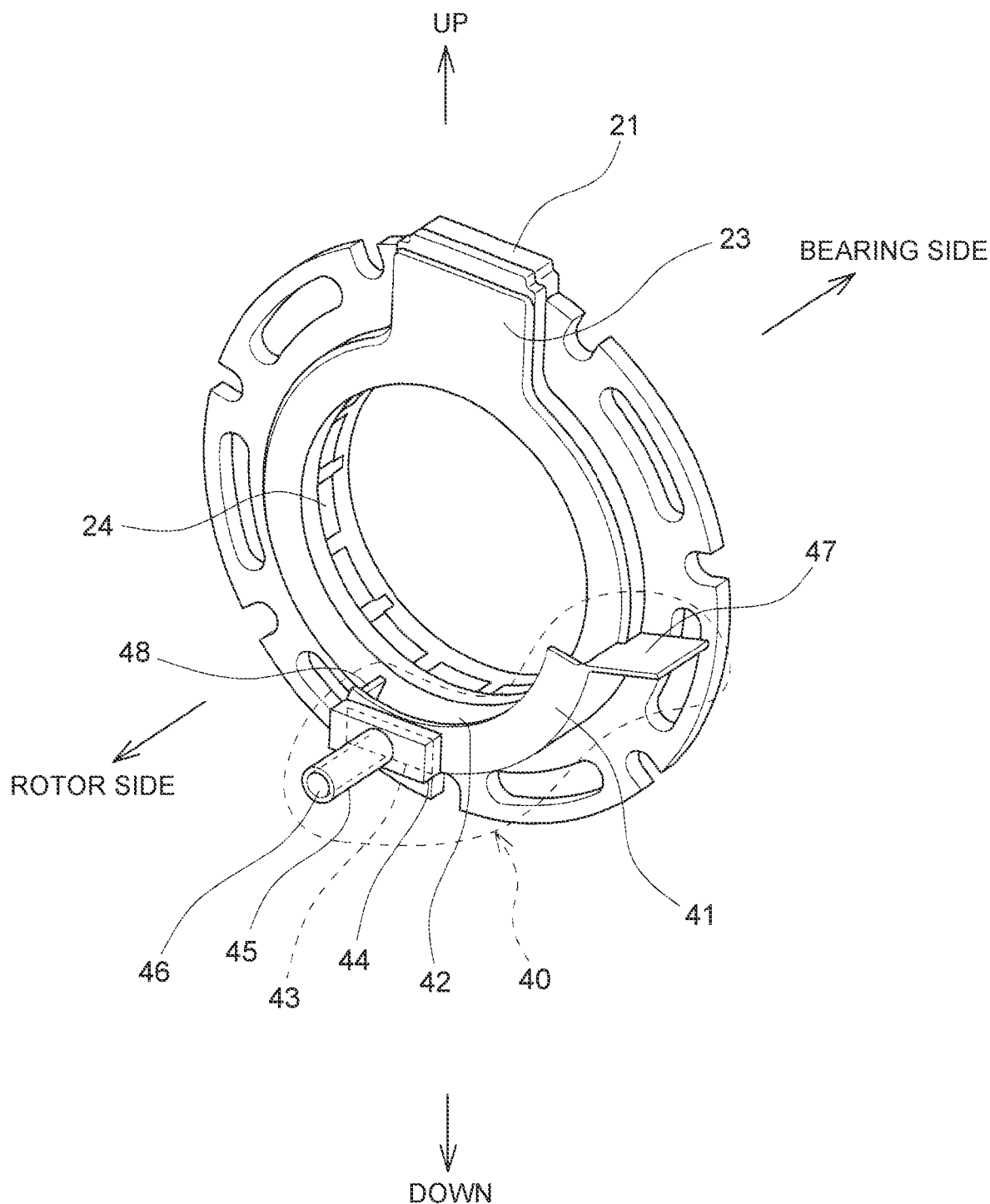
FIG. 3 is a perspective view showing an oil catch unit formed on a surface of a resolver stator facing a rotor.

As shown in FIG. 3 and FIG. 4, the L-shaped section member 41 is an arc-shaped member having a central angle of 80 to 90 degrees. The L-shaped section member 41 extends from a lower side of the annular member 31 in a direction of gravity toward a backward side in a rotation direction of the annular member 31, indicated by a first arrow 91 in FIG. 4, so as to form an arc shape. The closure plate 48 that covers an end in a circumferential direction of the groove 42 formed by the L-shaped section member 41 and the axial end surface 23 is mounted at an end of the L-shaped section member 41 on a forward side in the rotation direction. As shown in FIG. 2 and FIG. 3, a quadrangular opening 43 communicating with the groove 42 is provided near the closure plate 48 on the L-shaped section member 41. The chamber 44 having an open box shape covers the opening 43 from the rotor 13 side. The pipe 45 is mounted on the chamber 44 at a surface facing the rotor 13. An inner surface of the pipe 45 is continuous with an inner surface of the chamber 44 and the groove 42. An opening 46 of the pipe 45 facing the rotor 13 faces the cooling channel 14 of the rotor 13. The opening 46 forms an oil spout hole. The oil receiving plate 47 having a flat plate shape and extending radially outward is provided at an end of the L-shaped section member 41 located on the backward side in the rotation direction of the annular member 31. Thus, the oil receiving plate 47 is a plate that extends radially outward from an end of the groove 42 in the circumferential direction located on the backward side in the rotation direction. For example, the length of the oil receiving plate 47 may be two to three times the depth of the groove 42.

As shown in FIG. 2 and FIG. 4, the annular member 31 is fixed to the outer circumference of the shaft 12, on the resolver rotor 25 so as to be adjacent to the rotor 13. The outline of the annular member 31 has a cylindrical shape similar to the outline of the resolver rotor 25. A plurality of protrusions 32 is provided on an outer surface of the annular member 31. When the annular member 31 rotates with the shaft 12 in the direction of the first arrow 91 indicated in FIG. 4, leading end portions of the protrusions 32 move inside the groove 42 toward the closure plate 48. A surface of each protrusion 32 located on the forward side in the rotation direction is an inclined surface 32a that is inclined from a radial direction toward the backward side in the rotation direction. The closure plate 48 has such a height as not to interfere with the protrusions 32 of the annular member 31, and the protrusions 32 move on a radially inner side of the closure plate 48.

The L-shaped section member 41 and the axial end surface 23 of the resolver stator 21 on the side facing the rotor 13 form a groove-shaped cross-section including the groove 42, and thus the L-shaped section member 41 and the axial end surface 23 of the resolver stator 21 form an oil catch unit 40 having a groove-shaped cross-section.

Next, the operation of the motor cooling device 100 will be described. A gear (not shown) that scoops up cooling oil is mounted in the motor 10. When the shaft 12 and the rotor 13 of the motor 10 rotate, cooling oil is scooped up by the gear and thrown onto the stator 15, the coil end 16, etc. Part of the cooling oil is thrown onto an inner surface of the casing 11. The cooling oil having been thrown onto the inner surface of the casing 11, a surface of the coil end 16, etc. above the motor cooling device 100 shown in FIG. 1 falls from above the motor cooling device 100 to the motor cooling device 100. As indicated by a second arrow 92 in FIG. 4, the cooling oil having fallen from the inner surface of the casing 11 hits the oil receiving plate 47 and flows into the groove 42 of the oil catch unit 40.

When the shaft 12 rotates, the annular member 31 rotates as indicated by the first arrow 91 in FIG. 4. Then, the leading end portions of the protrusions 32 provided on the annular member 31 move inside the groove 42 of the oil catch unit 40 toward the closure plate 48. While thus moving, the protrusions 32 press the cooling oil toward an obliquely lower side by the inclined surfaces 32a located on the forward side in the rotation direction, and thereby pressurize the cooling oil between the inclined surfaces 32a and the closure plate 48. The pressurized cooling oil flows into the chamber 44 through the opening 43 provided near the closure plate 48. Then, as indicated by a third arrow 93 in FIG. 4, the cooling oil flows into the pipe 45 from inside the chamber 44, and spouts from the opening 46 at a leading end of the pipe 45 toward the rotor 13.

Since the pipe 45 is disposed at such a position as to face the cooling channel 14 of the rotor 13 as shown in FIG. 1, the cooling oil having flowed out of the opening 46 flows inside the cooling channel 14 of the rotor 13 and thereby cools the rotor 13, and then flows into the casing 11 from the opposite side of the cooling channel 14.

Thus, the cooling oil having flowed into the oil catch unit 40 is pressurized by the protrusions 32 of the annular member 31 and spouted from the opening 46 of the pipe 45 toward the cooling channel 14 of the rotor 13, so that the cooling oil flows into the cooling channel 14. Therefore, the rotor 13 can be efficiently cooled even when the shaft 12 does not include a center hole.

In the motor cooling device 100 of the embodiment, the resolver stator 21 of the resolver 20 mounted inside the casing 11 is used as a constituent member of the oil catch unit 40. Thus, the rotor 13 can be effectively cooled by a simple configuration. Moreover, the motor 10 can be downsized as the configuration of the device can be downsized.

The annular member 31, the L-shaped section member 41, the closure plate 48, the oil receiving plate 47, the chamber 44, and the pipe 45 that are constituent members of the motor cooling device 100 of this embodiment are made of resin. Thus, even when one of the components of the resolver 20 is used as a constituent member of the oil catch unit 40, the detection accuracy of the resolver 20 is less affected.

In the embodiment having been described above, the outline of the annular member 31 has been described as having a cylindrical shape similar to the outline of the resolver rotor 25. However, the outline of the annular member 31 is not limited to this example, and may instead have a triangular shape. The annular member 31 has been described as being made of resin, but may also be composed of metal. In this case, the outline of the annular member 31 may have the same shape as the outline of the resolver rotor 25 such that the detection accuracy of the resolver 20 is less affected. In this case, only the protrusions 32 of the annular member 31 may be made of resin.

In the embodiment, the configuration has been described in which cooling oil flows through the chamber 44 from the opening 43 of the L-shaped section member 41 and spouts from the opening 46 of the pipe 45 toward the rotor 13. However, when the axial distance between the L-shaped section member 41 and the rotor 13 is short, the pipe 45 may be omitted. Alternatively, a configuration may be adopted in which the chamber 44 is omitted and the opening 43 is similar in size to the opening 46 of the pipe 45, and the cooling oil spouts from the opening 43 toward the rotor 13.

In the embodiment, the oil catch unit 40 having a groove-shaped cross-section has been described as being formed by the L-shaped section member 41 and the axial end surface 23 of the resolver stator 21 on the side facing the rotor 13. However, the configuration of the oil catch unit 40 is not limited to this example. For example, the oil catch unit 40 may be provided inside the casing 11 at a position on the side where the resolver 20 is not provided. For example, the motor cooling device 100 may be provided on the side of the bearing 17 in FIG. 1. In this case, the oil catch unit 40 may be formed by mounting a part having a groove-shaped cross-section on the inner surface of the casing 11. Alternatively, as in the embodiment, the L-shaped section member 41 may be mounted on the inner surface of the casing 11, and the oil catch unit 40 may be formed by the L-shaped section member 41 and the inner surface of the casing 11. When the motor cooling device 100 is thus provided on the side where the bearing 17 is located, the annular member 31 having the protrusions 32 may be fixed to the outer circumference of the shaft 12 at a position where the resolver 20 is not provided, and may be configured to rotate with the shaft 12 inside the casing 11.

What is claimed is:

1. A motor cooling device, comprising:
   an annular member that is fixed to an outer circumference of a shaft of a motor and configured to rotate with the shaft inside a casing; and
   an oil catch unit that has a groove-shaped cross-section and is disposed inside the casing along an outer circumference of the annular member, with a groove of the oil catch unit facing an outer circumferential surface of the annular member,
   wherein the oil catch unit extends from a lower side of the annular member in a direction of gravity toward a backward side in a rotation direction of the annular member so as to form an arc shape,
   wherein the oil catch unit includes a closure plate and an oil spout hole, the closure plate being located on a forward side in the rotation direction and covering the groove at an end in a circumferential direction, the oil spout hole being bored near the closure plate so as to open toward a rotor of the motor, and
   wherein the annular member includes a protrusion that is provided on the outer circumferential surface of the annular member, and that is configured to move inside the groove of the oil catch unit toward the closure plate, on a radially inner side of the closure plate, when the annular member rotates with the shaft.

2. The motor cooling device according to claim 1, wherein:
   the rotor of the motor includes a cooling channel extending in an axial direction of the rotor; and
   the oil catch unit includes a pipe that is mounted on a surface facing the rotor and that extends toward the cooling channel of the rotor.

3. The motor cooling device according to claim 2, wherein the oil catch unit includes an oil receiving plate extending radially outward from an end of the groove in the circumferential direction located on the backward side in the rotation direction.

4. The motor cooling device according to claim 3, wherein:
   the oil catch unit is a part that has a groove-shaped cross-section and that is provided by an axial end surface of a resolver stator mounted inside the casing and an L-shaped section member mounted on the axial end surface; and
   the annular member is disposed on a resolver rotor rotating inside the resolver stator, adjacent to the rotor of the motor.

5. The motor cooling device according to claim 4, wherein the L-shaped section member, the annular member, and the pipe are composed of resin.

6. The motor cooling device according to claim 4, wherein the L-shaped section member and the pipe are composed of resin while the annular member is composed of metal.

* * * * *